C. W. HITCHNER.
SANDWICH CAKE MACHINE.
APPLICATION FILED MAY 9, 1913.
1,114,138.
Patented Oct. 20, 1914.
4 SHEETS—SHEET 2.
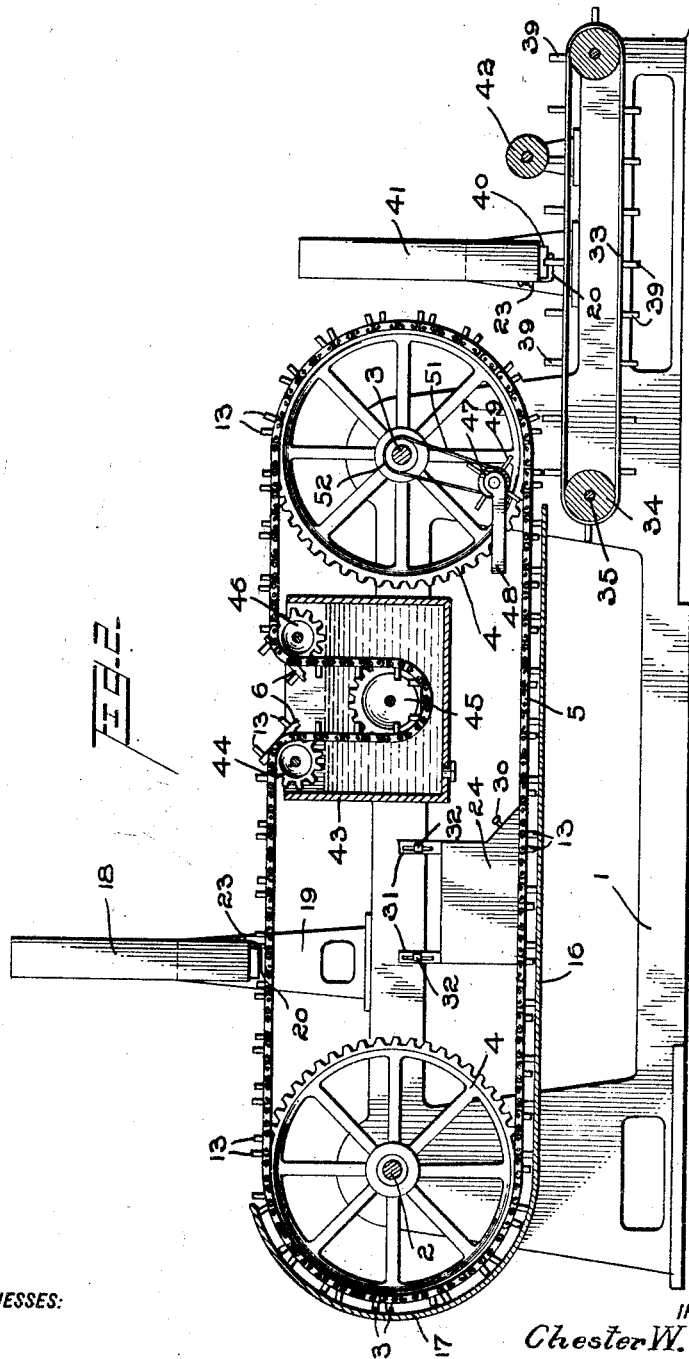

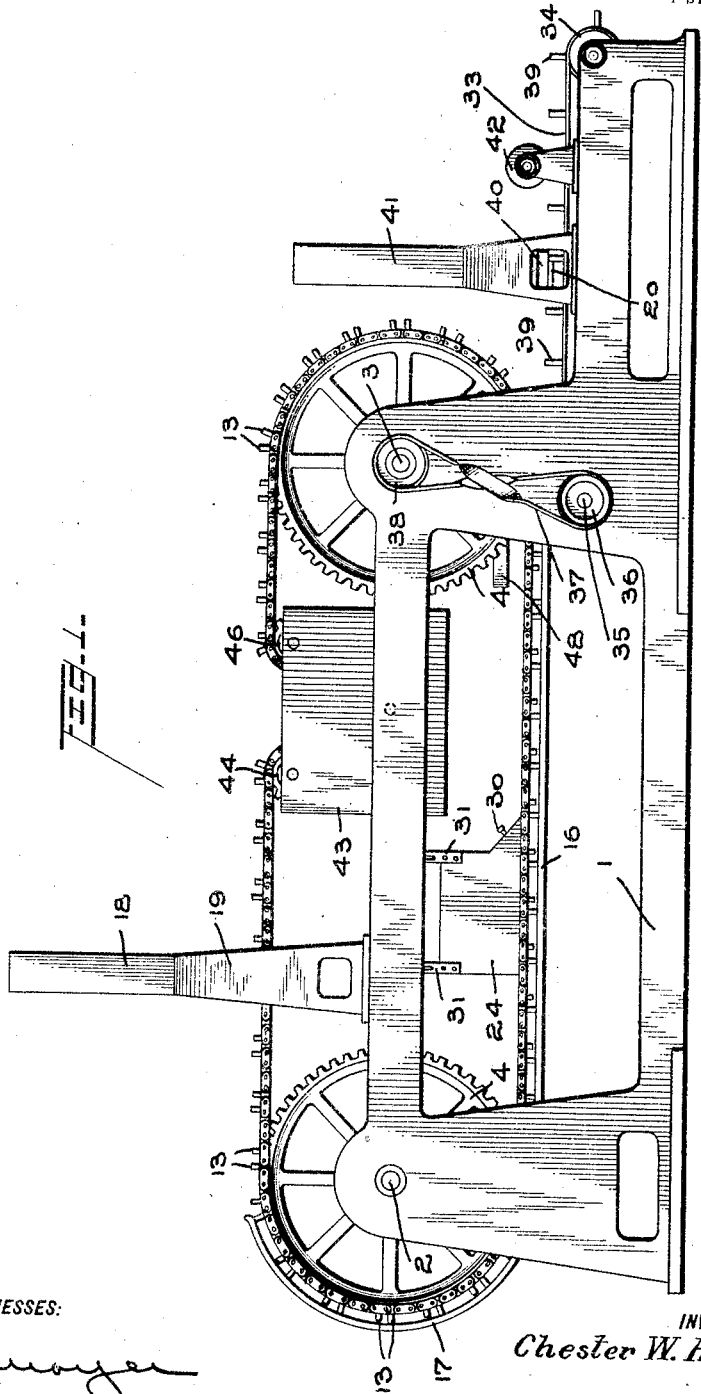

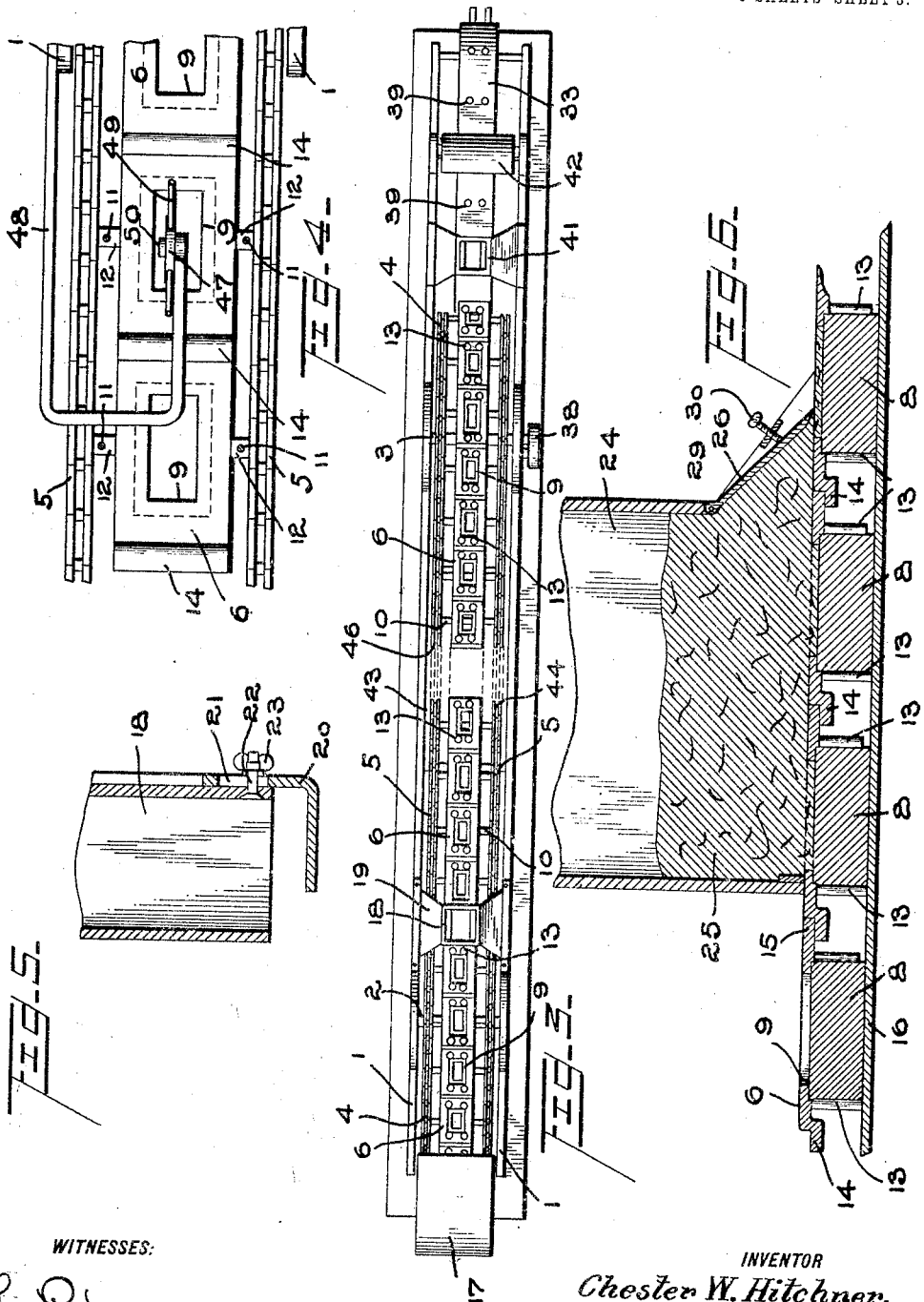

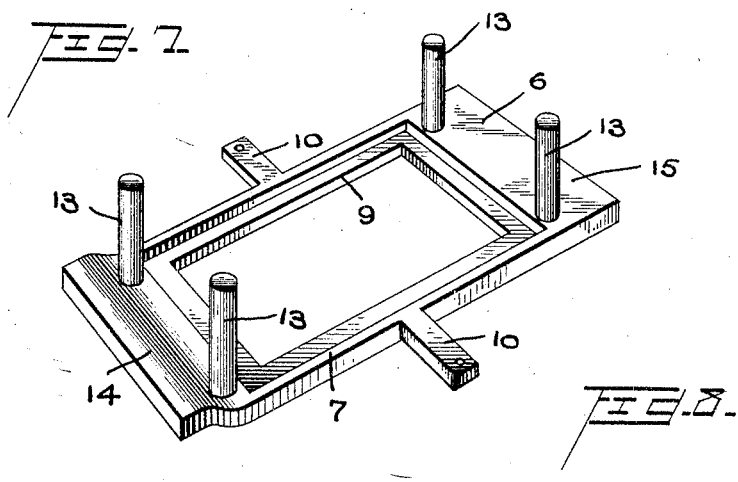
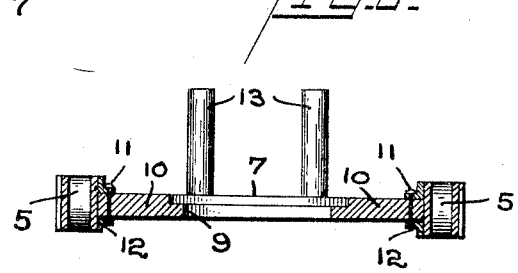
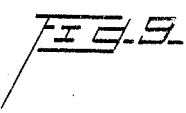
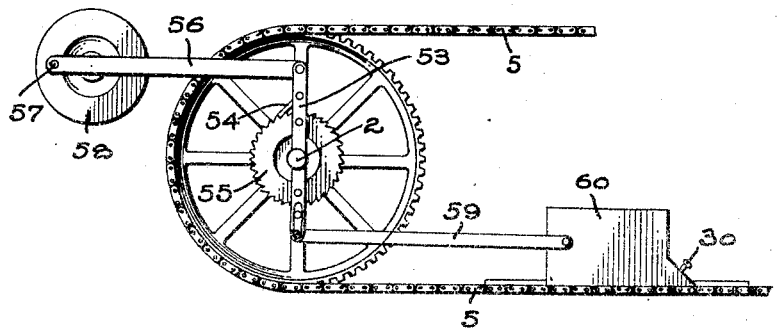

UNITED STATES PATENT OFFICE.

CHESTER W. HITCHNER, OF PHILADELPHIA, PENNSYLVANIA.

SANDWICH-CAKE MACHINE.

1,114,138.   Specification of Letters Patent.   Patented Oct. 20, 1914.

Application filed May 9, 1913. Serial No. 766,531.

*To all whom it may concern:*

Be it known that I, CHESTER W. HITCHNER, a citizen of the United States, residing at Philadelphia, in the county of Philadelphia and State of Pennsylvania, have invented certain new and useful Improvements in Sandwich-Cake Machines, of which the following is a specification.

My invention relates to improvements in sandwich cake machines, the object of the invention being to provide a machine which will automatically position between two cakes the filling of cream or other similar material to form a sandwich cake.

A further object is to provide improved mechanism for depositing on a cake the proper quantity of filling before receiving the other cake thereupon.

A further object is to provide an improved machine of this character which is capable of automatically forming a relatively large number of sandwich cakes in a relatively short space of time, and which performs the work with the minimum of parts as the machine is of extreme simplicity and strong and durable in use.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improvements. Fig. 2 is a view in longitudinal section. Fig. 3 is a top plan view. Fig. 4 is a fragmentary plan view of the lower run of the endless conveyer illustrating the rotary ejector compelling the cakes to drop from the endless conveyer. Fig. 5 is a fragmentary view in longitudinal section of one of the cake channels. Fig. 6 is a fragmentary view in vertical longitudinal section on an enlarged scale illustrating the filling or cream distributing receptacle. Fig. 7 is a perspective view of one of the cake carrying frames. Fig. 8 is a view in cross section through the center of the cake carrier illustrating its manner of attachment to the endless chains, and Fig. 9 is a fragmentary view in side elevation illustrating a modification.

1 represents a frame providing bearings for parallel shafts 2 and 3. Upon each of these shafts 2 and 3, two relatively large sprocket wheels 4 are mounted and serve to drive a pair of endless sprocket chains 5 which support cake frames 6 and constitute an endless conveyer. These cake frames 6 are formed with rectangular depressions 7 of a size to receive a cake illustrated at 8 and the depressed portion 7 of each frame is formed with a rectangular opening 9. Laterally projecting arms 10 are formed integrally with the frame and are removably connected by screws 11 with lugs 12 on the links of chains 5, so that the frames may be removed from the chains, and other frames substituted therefor.

Each frame 6 is provided with four pins 13 having their inner surfaces in line with the walls of the depression 7, and said pins and said depression of a combined height to conform to the thickness of a cake. Rather this is true of the rear pair of pins as the forward pair are preferably slightly shorter than the rear pair, as will more fully hereinafter appear.

One end of each frame 6 is bent upwardly to form a lip 14 which overlaps the flat end 15 of the end of the adjacent frame, so that these frames when in a horizontal line constitute a continuous surface in alinement, especially is this true when the frames are reversed as shown in Fig. 6.

A plate 16 is supported by the frame 1 below the lower run of the endless conveyer, and this plate 16 curves around the sprocket wheels 4 on shaft 2 as shown at 17, and is spaced therefrom the proper distance to permit the longer pins to rub thereagainst and allow the cake in the frame to slide against the plate without breaking.

A cake guiding column 18 is supported by an arched bracket 19 and is located above the upper run of the conveyer. These columns are of a shape in cross section to conform to the shape of the cakes 8, and at their lower ends are provided with angles 20 which are narrower than the column 18 and are adjustable vertically with relation to the column, so that they may be spaced below the lower end of the column but slightly in excess of the thickness of the cake. To permit this adjustment, the angle 20 is provided with a slot 21 through which a bolt 22 on the column projects, and a wing nut 23 on said bolt is adapted to clamp the angle at any adjustment.

It is to be understood that the angle 20 is sufficiently narrow to allow the pairs of pins 13 to pass on opposite sides thereof, but the rear pair of said pins engage the cake and force it longitudinally of the angle, and from under the pile of cakes, so that the cake will drop into the depressed portion 7 of the frame 6 as said frame passes under the column. To facilitate this operation, the forward pairs of pins 13 are slightly shorter than the rear pair as above set forth. The cake as it passes around sprocket wheels 2 is turned upside down and cannot fall out of the frame, because of plate 17.

As the cake is carried along the lower run of the conveyer, it is moved beneath a receptacle 24 containing cream or other filling 25. I would have it understood that in using this term "filling," I use it in its broadest sense to cover any material which may be used for the purpose. As the cakes are moved beneath receptacle 24, the filling 25 fills the opening 9 in the frame, so that the filling is on the cake, but is spaced from the edges of the cake a distance equal to the distance between the walls of the opening 9 and the walls of the depression 7.

A scraper 26 is pivotally connected to the rear wall of the receptacle as shown at 29, and is adjustable by means of a set screw 30, so that the proper pressure may be had upon the conveyer to scrape the surplus of filling off the conveyer and insure an equal distribution to each cake as it passes under the receptacle.

The receptacle 24 is adjustably mounted with relation to the conveyer, one construction which permits such adjustment is illustrated in Fig. 2 in which slotted hangers 31 are provided on the receptacle secured by set screws 32 to the frame.

The cakes 8 with their proper amount of filling are moved along plate 16 until they reach the end of this plate and are then dropped upon an endless apron 33. This apron 33 is supported upon drums 34 and a shaft 35 on which one of these drums is mounted, is provided with a pulley 36 connected by a crossed belt 37 with a pulley 38 on shaft 3, so that the apron 33 is driven the proper speed.

Pins 39 are provided on apron 33, so that the cakes dropped on the frames 6 will be carried on the conveyer between the pins, and these pins 39 cause an upper cake 40 to be removed from the lower end of a column 41 similar in all respects to the column 18. The cakes 40 therefore are deposited upon the filling 25 to form the sandwich and the completed sandwich is passed under a gravity pressure roll 42 which exerts sufficient pressure to insure the upper cakes sticking to the filling.

The completed sandwich cake may be removed or falls off the end of the apron 33. The upper run of the conveyer is compelled to travel through a washing tank 43 containing hot water. This is accomplished by passing the chains around idle sprockets 44, 45, and 46 as clearly shown in Fig. 2. This water will be extremely hot, so that the conveyer will dry before it reaches the column 18.

To insure the cakes dropping from the endless conveyer onto the apron 33, I provide a rotary ejector 47 which is mounted on a bracket arm 48 and is provided with a circular series of fingers 49 which bear downwardly upon the center of the filling and cake in each frame to depress the cakes sufficiently to dislodge any which may stick in the frame.

A pulley 50 is secured to turn with the ejector and is connected by an endless belt 51 with a pulley 52 on shaft 3, so that the rotary ejector is driven at the proper speed. It will thus be noted that the cakes are removed first from column 18 and carried in the frame 6, said frames being reversed as they pass around in contact with the curved portion 17 of plate 16, and move along plate 16 in the reversed position to receive thereon the filling 25. This cake with the filling is dropped onto apron 33 and pins 39 compel a cake to move from the bottom of column 41 onto the filling, and the sandwich cake thus made is pressed slightly by the roller 42. By reason of the fact that the opening 9 is smaller than the depression 7, the filling does not reach the edges of the cake, so that the dimension of the filling relative the cake will be restricted.

In Fig. 8 I illustrate a modification in which shaft 2 receives an intermittent rotary movement by means of an oscillating lever 53 fulcrumed between its ends on the shaft 2 and carrying a pawl 54 engaging a ratchet wheel 55 secured to the shaft 2. Lever 53 is oscillated by a pitman 56 connected to the crank pin 57 by a crank wheel 58 driven by any suitable source of power.

Lever 53 is adjustably connected by a link 59 with a receptacle 60 which corresponds in construction to the receptacle 24 above referred to. This receptacle 60 rests upon the lower run of the endless conveyer, and as the conveyer receives an intermittent movement, the receptacle 60 is reciprocated so that it spreads or wipes the filling onto the cakes.

Various other slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. An apparatus of the character described, comprising an endless conveyer consisting of a series of cake receiving frames, said frames having openings therein, means for depositing cakes in the frames, and means for applying filling to the cakes through the openings in the frames, substantially as described.

2. An apparatus of the character described, comprising a conveyer consisting of a series of cake receiving frames having openings therein, means for depositing cakes in the frames, actuating means for reversing the frames, and means for applying filling to the cakes through the openings in the frames after the latter are inverted, substantially as described.

3. An apparatus of the character described, comprising an endless conveyer consisting of a series of cake receiving frames, said frames having openings therein, each frame having pins projecting therefrom, the pins at one end of the frame longer than the others, means for depositing cakes in the frames, and means for applying filling to the cakes through the openings in the frames, substantially as described.

4. An apparatus of the character described, comprising a conveyer consisting of a series of cake receiving frames having openings therein, each frame having pins projecting therefrom, the pins at one end of the frame longer than the others, means for depositing cakes in the frames, actuating means for reversing the frames, and means for applying filling to the cakes through the openings in the frames after the latter are inverted, substantially as described.

5. An apparatus of the character described, comprising an endless conveyer consisting of a series of cake receiving frames, said frames having openings therein, said frames having cake receiving depressions therein, means for depositing cakes in the frames, and means for applying filling to the cakes through the openings in the frames, substantially as described.

6. An apparatus of the character described, comprising a conveyer consisting of a series of cake receiving frames having openings therein, said frames having cake receiving depressions therein, means for depositing cakes in the frames, actuating means for reversing the frames, and means for applying filling to the cakes through the openings in the frames after the latter are inverted, substantially as described.

7. An apparatus of the character described, comprising an endless conveyer consisting of a series of cake receiving frames, said frames having openings therein, said frames having cake receiving depressions therein, and pins on the frames at opposite sides of the depressions, the pins at one side of the depression longer than the pins at the other side of the depression, means for depositing cakes in the frames, and means for applying filling to the cakes through the openings in the frames, substantially as described.

8. An apparatus of the character described, comprising a conveyer consisting of a series of cake receiving frames having openings therein, said frames having cake receiving depressions therein, and pins on the frames at opposite sides of the depressions, the pins at one side of the depression longer than the pins at the other side of the depression, means for depositing cakes in the frames, actuating means for reversing the frames, and means for applying filling to the cakes through the openings in the frames after the latter are inverted, substantially as described.

9. An apparatus of the character described, comprising an endless conveyer consisting of a series of cake receiving frames, said frames having openings therein, said frames having cake receiving depressions therein, and pins on the frames at opposite sides of the depressions, the pins at one side of the depression longer than the pins at the other side of the depression, means for depositing cakes in the frames, and means for applying filling to the cakes through the openings in the frames, the ends of adjacent frames overlapping each other, substantially as described.

10. An apparatus of the character described, comprising a conveyer consisting of a series of cake receiving frames having openings therein, said frames having cake receiving depressions therein, and pins on the frames at opposite sides of the depressions, the pins at one side of the depression longer than the pins at the other side of the depression, means for depositing cakes in the frames, actuating means for reversing the frames, and means for applying filling to the cakes through the openings in the frames after the latter are inverted, the ends of adjacent frames overlapping each other, substantially as described.

11. An apparatus of the character described, comprising an endless conveyer consisting of a series of cake receiving frames, said frames having openings therein, said frames having cake receiving depressions therein, and pins on the frames at opposite sides of the depressions, the pins at one side of the depression longer than the pins at the other side of the depression, means for depositing cakes in the frames, means for applying filling to the cakes through the openings in the frames, the ends of adjacent frames overlapping each other, endless chains at opposite sides of the frames, and laterally projecting arms on the frames removably secured to said chains, substantially as described.

12. An apparatus of the character described, comprising a conveyer consisting of a series of cake receiving frames having openings therein, said frames having cake receiving depressions therein, and pins on the frames at opposite sides of the depressions, the pins at one side of the depression longer than the pins at the other side of the depression, means for depositing cakes in the frames, actuating means for reversing the frames, and means for applying filling to the cakes through the openings in the frames after the latter are inverted, the ends of adjacent frames overlapping each other, endless chains at opposite sides of the frames, and laterally projecting arms on the frames removably secured to said chains, substantially as described.

13. In an apparatus of the character described, the combination with a cake guiding column, having an angle secured thereto and projecting below its lower end, said angle narrower than the column and spaced below the lower end thereof a distance slightly greater than the thickness of the cake, of an endless conveyer below the column, said conveyer comprising a series of cake receiving frames, and a pair of pins on each end of each frame, the pair of pins at the rear end of each frame longer than the pins at the forward end of the frame and adapted to move below the column at opposite sides of the angle and draw a cake from the column into the frame, substantially as described.

14. In an apparatus of the character described, the combination with a cake guiding column, having an angle secured thereto and projecting below its lower end, said angle narrower than the column and spaced below the lower end thereof a distance slightly greater than the thickness of the cake, of an endless conveyer below the column, said conveyer comprising a series of cake receiving frames, pins on the frames adapted to move below the column at opposite sides of the angle and draw a cake from the column into the frame, said frames having cake depressions therein into which the cakes are moved when drawn from the column, said frames having openings in their depressed portions, and means for applying filling to the cakes through said openings, substantially as described.

In testimony whereof I have signed my name to this specification in the presence of two subscribing witnesses.

CHESTER W. HITCHNER.

Witnesses:
MARY E. DITTUS,
CHAS. E. POTTS.